(12) United States Patent
Farag (10) Patent No.: US 11,496,936 B2
(45) Date of Patent: *Nov. 8, 2022

(54) CACHE ADJUSTMENT BEFORE ENCOUNTERING DIFFERENT CIRCUMSTANCE

(71) Applicant: T-Mobile USA, Inc., Bellevue, WA (US)

(72) Inventor: Paul Farag, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,866

(22) Filed: Jun. 29, 2020

(65) Prior Publication Data

US 2021/0410029 A1    Dec. 30, 2021

(51) Int. Cl.
*H04W 24/08* (2009.01)
*H04W 36/02* (2009.01)
*H04L 43/0864* (2022.01)
*H04L 43/0894* (2022.01)
*H04W 88/02* (2009.01)
*H04W 36/08* (2009.01)

(52) U.S. Cl.
CPC ....... *H04W 36/023* (2013.01); *H04L 43/0864* (2013.01); *H04L 43/0894* (2013.01); *H04W 24/08* (2013.01); *H04W 36/08* (2013.01); *H04W 88/02* (2013.01)

(58) Field of Classification Search
CPC ....... H04W 4/02; H04W 24/08; H04W 28/02; H04W 28/14; H04W 28/18; H04W 4/029; H04W 4/00; H04W 4/027; H04W 36/023; H04L 29/08; H04L 47/127; H04L 47/30; H04L 47/823; H04L 65/80; H04L 67/2847
See application file for complete search history.

(56) References Cited

U.S. PATENT DOCUMENTS

| 6,750,813 | B2 | 6/2004 | Vargas-Hurlston et al. |
| 7,203,487 | B2 | 4/2007 | Comp |
| 9,247,523 | B1 | 1/2016 | Bhatia et al. |
| 10,448,283 | B2 | 10/2019 | Bongaarts et al. |
| 11,089,354 | B1 * | 8/2021 | Ramani .............. H04N 21/4335 |

(Continued)

FOREIGN PATENT DOCUMENTS

| EP | 2901333 B1 | 1/2019 |
| GB | 2511860 A | 9/2014 |
| WO | 2016058648 A1 | 4/2016 |

OTHER PUBLICATIONS

Canadian Patent Application No. 3070731, Office Action dated Mar. 25, 2021, 4 pages.

(Continued)

*Primary Examiner* — Jean A Gelin
(74) *Attorney, Agent, or Firm* — Han Santos, PLLC (57) ABSTRACT

Buffering streaming content includes accessing prior device location data of a device and predicting a future sector that the device will travel through based at least in part on the prior device location data. A predicted quality of service of wireless communications is determined and a streaming buffer is adjusted based at least in part on the predicted quality of service and a caching policy set in accordance with key variables related to network conditions in the future sector.

20 Claims, 7 Drawing Sheets

(56) References Cited

U.S. PATENT DOCUMENTS

| | | |
|---|---|---|
| 2005/0207437 A1 | 9/2005 | Spitzer |
| 2006/0077994 A1 | 4/2006 | Spindola et al. |
| 2008/0151817 A1* | 6/2008 | Fitchett ................ H04W 28/20 370/329 |
| 2009/0245118 A1 | 10/2009 | McCormick |
| 2010/0029263 A1 | 2/2010 | Senoo et al. |
| 2010/0203881 A1 | 8/2010 | Romero et al. |
| 2010/0330988 A1 | 12/2010 | Granlund et al. |
| 2012/0064908 A1* | 3/2012 | Fox .................... H04L 12/1489 455/452.2 |
| 2013/0322365 A1 | 12/2013 | Martin et al. |
| 2014/0022919 A1 | 1/2014 | Dwivedi et al. |
| 2014/0157142 A1 | 6/2014 | Heinrich et al. |
| 2014/0378141 A1* | 12/2014 | Walley ................ H04W 36/023 455/437 |
| 2015/0049602 A1 | 2/2015 | Gavita et al. |
| 2015/0120087 A1 | 4/2015 | Duan et al. |
| 2015/0350276 A1 | 12/2015 | Karlsson et al. |
| 2016/0248704 A1* | 8/2016 | Soelberg ............... H04L 47/522 |
| 2017/0180275 A1 | 6/2017 | Krinsky |
| 2017/0208434 A1 | 7/2017 | Shenhav et al. |
| 2019/0045399 A1* | 2/2019 | Bongaarts ........ H04N 21/64738 |
| 2021/0011766 A1* | 1/2021 | Kumar .................. G06F 9/5044 |

OTHER PUBLICATIONS

European Patent Application No. 18843322.1, Extended Search Report dated Feb. 10, 2021, 8 pages.
International Application No. PCT/US2018/045286, International Search Report and Written Opinion dated Nov. 23, 2018, 12 pages.
U.S. Appl. No. 15/671,057 Notice of Allowance dated Jun. 20, 2019, 18 pages.
U.S. Appl. No. 15/671,057, Final Office Action dated Jul. 3, 2018, 57 pages.
U.S. Appl. No. 15/671,057, Final Office Action dated Apr. 17, 2019, 78 pages.
U.S. Appl. No. 15/671,057, Non Final Office Action dated Mar. 1, 2018, 112 pages.
U.S. Appl. No. 15/671,057, Non Final Office Action dated Nov. 7, 2018, 68 pages.

* cited by examiner

CACHE ADJUSTMENT BEFORE ENCOUNTERING DIFFERENT CIRCUMSTANCE

BACKGROUND

The subject matter disclosed in U.S. Pat. No. 10,448,283, entitled "Dynamic Predictive Buffering," is hereby incorporated by reference herein.

With today's applications, content is often streamed to a given user device via a combination of wired and wireless media, both of which are subject to variations in data communication quality and reliability. Wireless networks in particular are subject to quality degradation under a variety of conditions. These conditions may include: low signal strength, poor signal to noise ratio, interference, etc. For example, a mobile user device by nature is mobile and therefore can have issues with signal strength or network conditions due to many variables such as congestion or variability in network coverage. Solutions are sought that may reside on the network, for example at a network server.

In some wireless carrier networks, wireless data is transmitted from an antenna (e.g., cellular radio tower) to a user device. In such networks, Quality of Service (QoS) may differ from location to location due to factors such as those mentioned above. For example, in a cellular context, QoS may differ from one cell to the next as a mobile device crosses over or enters into a new cell. QoS may even differ within a cell. Disruptions in the content presentation via the mobile device, such as interrupted delivery of content, due to differing conditions negatively impact the user experience.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure relates to caching and buffering information, e.g., by a user device in a wireless carrier network, before encountering a different circumstance. Embodiments of the disclosure may include both predicting a future circumstance having a different network condition (e.g., a cell, sector, mode of transportation, noisy location, and/or the like) that a user device will encounter (e.g., based on prior device location data) and predicting a quality of service (QoS) in the future circumstance. This disclosure uses "QoS" to refer to a qualitative or quantitative measure of the user experience, as a result of network conditions.

For convenience throughout this disclosure, "circumstance" may represent or be used interchangeably with terms such as "sector," "cell," "area," "zone," "location," "geolocation," and/or so forth, without distinction, unless the context suggests otherwise. Moreover, embodiments will be described in which "content," "data," "information," "communications," and the like are "streamed" or otherwise communicated or transferred to a user device. "Content," "data," "information," "communications," and the like are used interchangeably at times understood by one of ordinary skill to whom this disclosure is directed. Other similar terms may also be used. "Streaming" includes communication of content including, but not limited to, multimedia content such as audio and/or video, voice data such as VOIP (Voice Over Internet Protocol), and other information which can ordinarily be consumed in real time or pseudo-real time by the user device.

In some embodiments described herein, the future circumstance may include a new sector in a wireless carrier network The future circumstance prediction may include analyzing historical device mobility behavior based on both time and location data (i.e., from a global navigation satellite system ("GNSS")), among others. Predicting the future QoS may include analyzing historical quality of service data for the future circumstance. For example, if a user's daily drive from home to work includes an area of known lower quality wireless coverage, and time/location data from a user device indicates that the user is driving from home to work, then it may be determined that the user will encounter the known area of lower quality wireless coverage.

In some embodiments, the user device has memory including a buffer cache, the size of which may be adjusted in accordance with a caching strategy for the amount of content delivered to the user device based on differences in network conditions from a current circumstance to a future circumstance, such as when the QoS of a future circumstance is predicted to differ from the current circumstance. This represents an improvement in that the user has greater control over caching strategy and policy. The caching strategy may take into account, for example and without limitation, buffer cache size, caching speed, content data rate, content resolution, and so forth. For example, in a wireless network, a user device passing from one sector to another may encounter a QoS in the new sector that is inferior to the QoS of the current sector of wireless communication from a wireless carrier network might be different. This represents another improvement over utilizing a static or fixed-size buffer cache even when interruptions or delays in content delivery may exceed the buffer cache size and consequently cause a noticeable disruption in content delivery. For example, when a user streaming video data on a user device encounters a disruption in service when entering a new network zone, they may experience a stoppage in the video. Thus, existing buffering techniques are susceptible to disruptions in the user experience as the user device moves between circumstances (here, network zones) of differing service quality.

In some embodiments, the user device adjusts its own buffer cache. The amount of memory (size) dedicated to cache may be adjusted (increased or decreased) or the allotted portion of existing cache may be adjusted. In some embodiments such as crossing between sectors, the buffer cache may be adjusted each sector for the duration of the sector. Alternatively, the buffer cache may be adjusted only when the app predicts that a future sector (circumstance) calls for adjustment in accordance with the caching strategy.

In some embodiments, the buffer cache may be increased or decreased by the app when both the predicted QoS (whether predicted on the user device or pushed from a network-based service) for the wireless communication from the wireless carrier network in the future sector is below a threshold level, and when the current QoS for the wireless carrier network in the current sector is above a minimum threshold level (i.e., the current QoS is more favorable than the predicted future QoS). In some embodiments, adjusting the buffer cache may include decreasing the buffer cache allocation to the incoming content when the predicted QoS in the future sector is superior to the current QoS. Therefore, a streaming buffer can be adjusted on the mobile device using dynamic predictive buffering (size and/or speed, etc.) to limit interruptions in streaming data when inferior QoS is predicted on the mobile device while also maintaining network efficiency when the predicted quality of service is sufficient to maintain a user's streaming experience.

The network availability and throughput may be mapped over time and loss calculated. The key variables for the application to work may be tracked over time, and based on changes in the measurements, a future degraded state may be forecast and caching of the content established based on those variables and a caching strategy for the user device, set and/or enforced in some embodiments by the mobile device for itself in accordance with pre-established rules dynamically applied.

The point when the application begins to cache may depend on the content being streamed, cache available on the device, current and predicted network behavior in the current and future circumstance, and/or other factors (some of which may be customized) to determine the amount of time for caching before entering into a new circumstance of reduced or improved communication quality. In this way, the user device is set to enter the new circumstance before approaching the boundary between circumstances. In the example of transitioning from one wireless network sector to another, the current communication is not torn down before the cache is built and filled sufficiently to continue real time "capture" (e.g., download) and maintain streaming in an uninterrupted manner.

In an illustrative example, if a user's daily commute to school includes a subway (a different circumstance), historical device location data specific to the user's device may be utilized to predict a disruption in service when the user enters the subway. Other examples of circumstances may include, without limitation, geographical landmarks (e.g., a train station, exit, museum, and/or the like) that, coupled with mobile device location (determined by GPS, for example), may identify to a degree of precision the relative distance and time to closing between the mobile device and such geographical landmarks. As such, the buffer cache of the user device may be temporarily increased to hold more content (e.g., video data of a movie that the user is streaming) to preserve the user experience. In some embodiments, data from the user or from multiple users can be aggregated on the user device and input to a learning algorithm, the outputs of which may feed and refine the predictive algorithm. Human feedback may also be incorporated into the learning algorithm. The predictive algorithm may be quantitative and/or qualitative and may provide an indication of a relative increase or decrease compared to a past, current, or future circumstance.

The techniques described herein may be implemented in a number of ways. Example implementations are provided below with reference to the following FIGS. 1-7.

The following description presents certain aspects in a (wireless) cellular environment. Thus, user devices are said to transition or cross over between cells or sectors delineated by boundaries. It should be noted that these are illustrative embodiments and not limiting. That is, a cell or sector is an example of a "circumstance" described elsewhere herein and a boundary is an example of definition provided to adjoining circumstances to mark a transition or crossover between the two (here, between cells or sectors).

Figure 1:
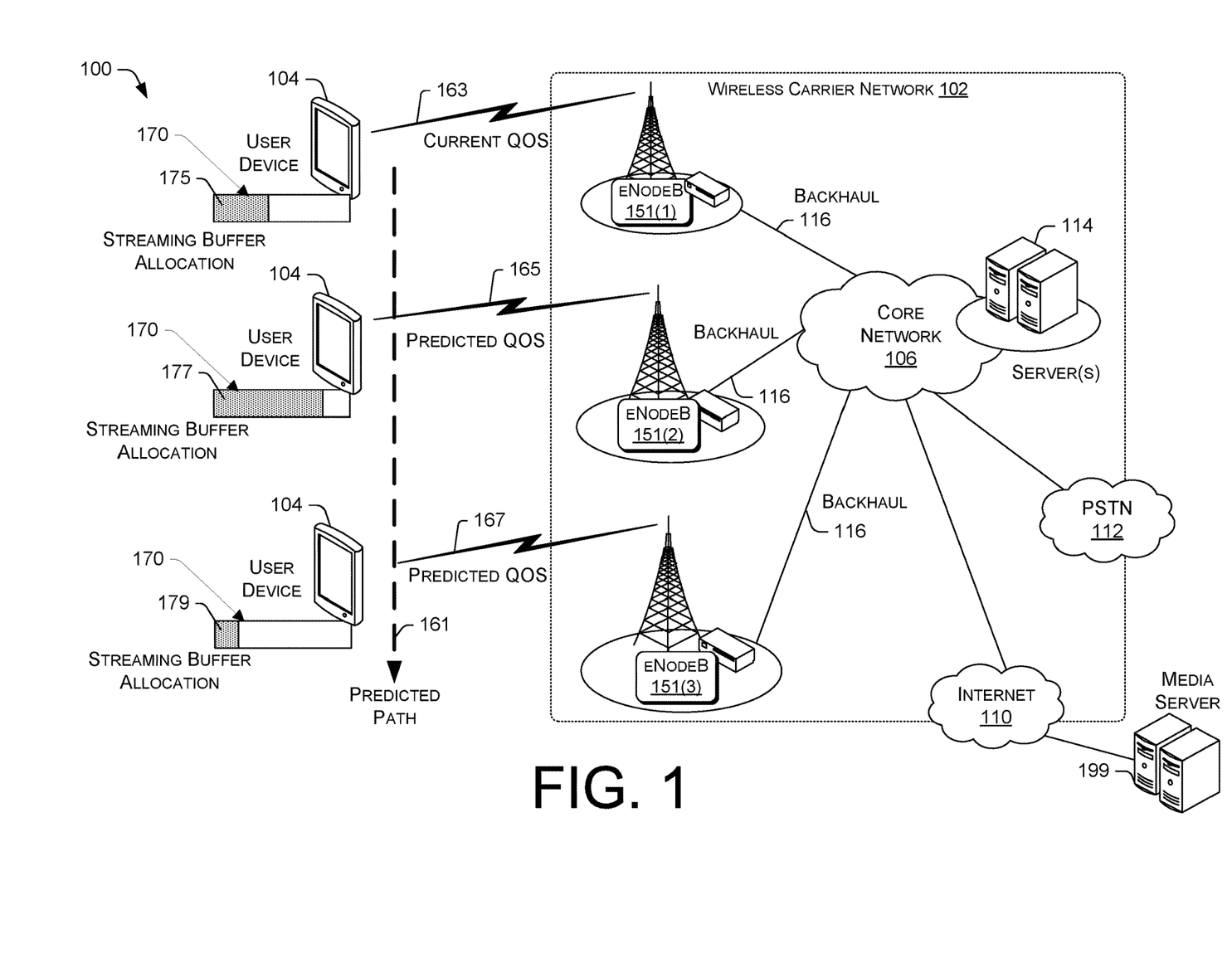
FIG. 1 illustrates an example architecture including a user device receiving data from a wireless carrier network.

FIG. 1 illustrates an example architecture 100 including a user device 104 receiving data from a wireless carrier network 102. The wireless carrier network 102 may facilitate cellular data communication such as voice calls, texts, and data. Example cellular data standards implemented by the wireless carrier network 102 for cellular data communications may include Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The illustrated wireless carrier network 102 includes a core network 106 that may provide telecommunication and data communication services to the user device 104. For example, the core network 106 may connect user devices (via base stations and backhaul 116) to other telecommunication and data communication networks, such as the Internet 110 and the public switched telephone network (PSTN) 112. In various embodiments, the core network 106 may include one or more servers 114 that implement network components. For example, the network components may include a serving GPRS support node (SGSN) that routes voice calls to and from the PSTN 112, and a Gateway GPRS Support Node (GGSN) that handles the routing of data communication between external packet switched networks and the core network 106. The network components may further include a Packet Data Network (PDN) gateway (PGW) that routes data traffic between the GGSN and the Internet 110. The network components may also include an Operations Support System (OSS) platform for managing network configuration, fault management, and provisioning of the wireless carrier network 102.

The wireless carrier network 102 may also include a radio access network including multiple base stations. The multiple base stations are responsible for handling voice and data traffic between multiple user devices, such as the user device 104 and the core network 106. In the illustrated embodiment of FIG. 1, the base stations are in the form of eNodeB nodes 151. Each eNodeB node 151 may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell" or "sector." The BTS may send RF signals to user devices and receive radio signals from user devices to facilitate wireless communication. Each eNodeB node 151 may be connected to the core network 106 via the backhaul connection 116, as illustrated.

In the illustrated embodiment, the wireless carrier network 102 may access media stored on one or more media servers such as a media server 199 via the Internet 110. In an example, the wireless carrier network 102 may facilitate streaming audio data from an album stored on the media server 199 to the user device 104. In another example, the wireless carrier network 102 may facilitate streaming video data from a movie or television series stored on the media server 199 to the user device 104. In some embodiments (not illustrated), a content distribution network (CDN) may be included in the wireless carrier network 102 and streaming media may be stored in the CDN. In such embodiments, the wireless carrier network 102 may facilitate the streaming of the media from the CDN to the user device 104. Those skilled in the art appreciate that CDNs may be implemented as servers to provide media content to users based on the geographic location of the user and reduce network latency.

The user device 104 may be a smartphone, a tablet computer, an embedded computer system, or any other device that is capable of using the wireless communication services that are provided by the wireless carrier network 102. In some embodiments, the user device 104 is connected to eNodeB 151(1) at a current quality of service (QOS) 163 with a buffer cache allocation 175 of a buffer cache 170 set in accordance with a cache policy. As the user device 104 moves among different cells in the wireless carrier network 102 (for example, along the predicted path 161), the buffer cache allocation may change from the buffer cache allocation 175. For example, when moving from the current cell having the QoS 163 to a new, or future, cell having a QoS 165 predicted to be inferior relative to the QoS 163, an app on the user device 104 adjusts the size of the buffer cache allocation so that, on entering the future cell having the predicted QoS 165, the buffer cache allocation has a larger buffer cache allocation 177.

Furthering the illustrated example, when moving from the (now) current cell having the QoS 165 along the predicted path 161 to a future cell having a QoS 167 expected to be superior relative to the QoS 165, the app on the user device 104 adjusts the size of the buffer cache allocation so that, on entering the future cell having the predicted QoS 167, the buffer cache allocation has been decreased to the buffer cache allocation 179.

In FIG. 1, the QoS 165 or the QoS 167 may be predicted based on the predicted path 161 of the user device 104, which may be derived from prior device location data of the user device 104. In other words, the buffer cache allocation 175 of the buffer cache 170 is increased prior to entering the cell having the QoS 165 because the predicted QoS 165 of eNodeB 151(2) is below the QoS 163. Increasing the buffer cache allocation for the user device 104 may maintain the viewing experience for a user of the user device 104 as the user device 104 moves across the cell boundary into a cell having a lesser QoS, such as the QoS 165 provided by eNodeB 151(2). Similarly, the buffer cache allocation 177 of the buffer cache 170 is decreased prior to entering the cell having the QoS 167 because the predicted QoS 167 of eNodeB 151(3) is above the QoS 165. Decreasing the buffer cache allocation for the user device 104 may free up cache for other purposes while maintaining the viewing experience for a user of the user device 104 as the user device 104 moves across the cell boundary into the cell having the greater QoS, such as the QoS 167 provided by eNodeB 151(3).

Figure 2:
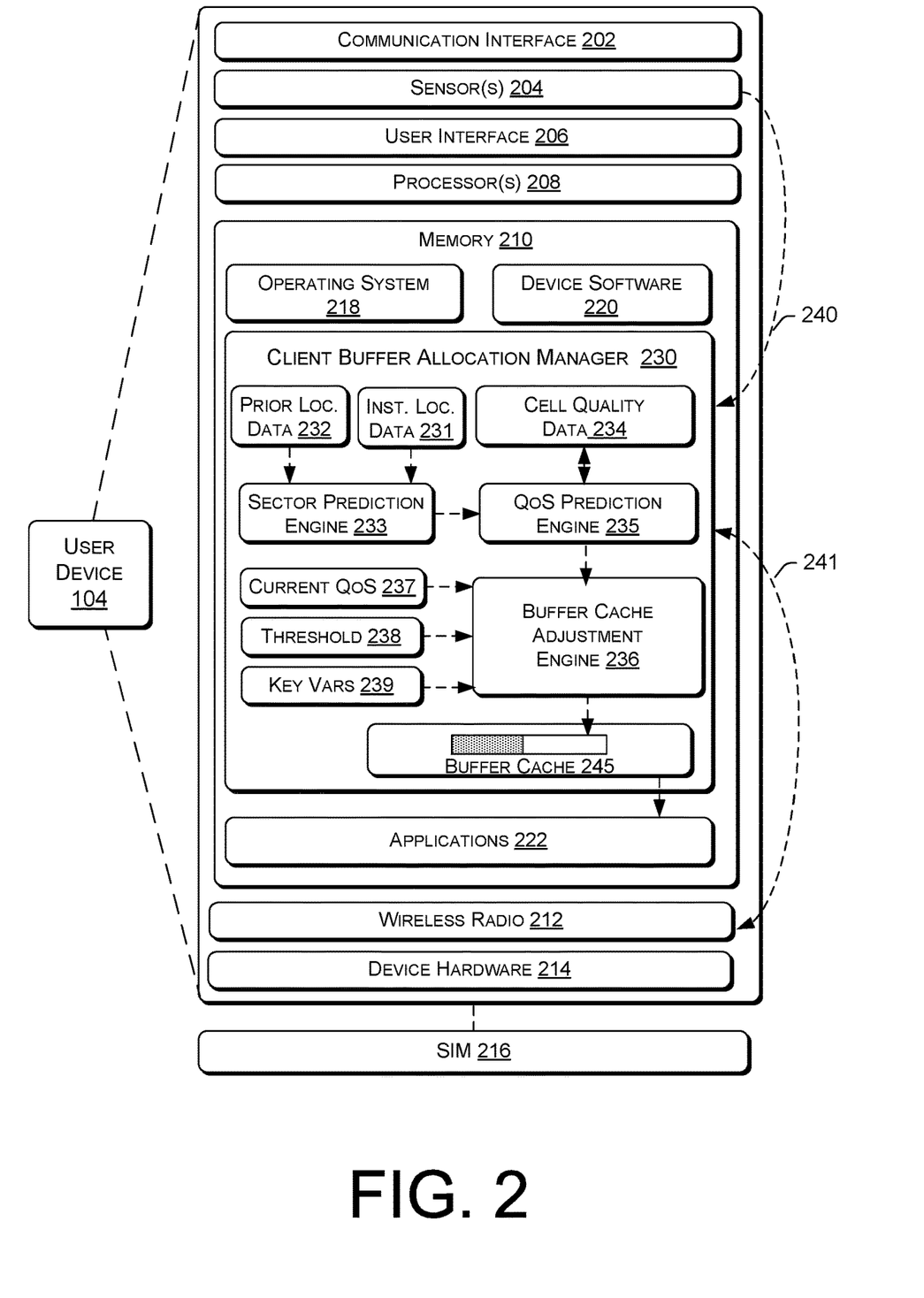
FIG. 2 is a block diagram showing various components of an example user device that is configured to adjust a buffer cache allocation based at least in part on a predicted quality of service of a predicted future sector that the user device will encounter.

FIG. 2 is a block diagram showing various components of an example user device 104 that is configured to adjust a buffer cache allocation based at least in part on a predicted quality of service of a predicted future sector that the user device will encounter. The user device 104 may include a communication interface 202, one or more sensors 204, a user interface 206, one or more processors 208, and memory 210. The communication interface 202 may include wireless and/or wired communication components that enable the electronic device to transmit or receive voice or data communication via the wireless carrier network 102, as well as other telecommunication and/or data communication networks. The sensors 204 may include a proximity sensor, a compass, an accelerometer, altimeter, cameras, and/or a global positioning system (GPS) sensor. The compass, the accelerometer, and the GPS sensor may detect orientation, movement, and geolocation of the user device 104.

The user interface 206 may enable a user to provide input and receive output from the user device 104. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer-readable storage media can include or encompass volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The user device 104 may also include a wireless radio 212 and other device hardware 214. The wireless radio 212 may include hardware components that enable the user device 104 to perform telecommunication and data communication with the wireless carrier network 102, Wi-Fi networks, and/or Bluetooth enabled devices. The device hardware 214 may include other hardware that is typically located in a mobile telecommunication device. For example, the device hardware 214 may include signal converters, transceivers, antennas, hardware decoders and encoders, graphic processors, a SIM card slot, and/or the like that enable the user device 104 to execute applications and provide telecommunication and data communication functions. The SIM 216 may be an integrated circuit chip that is inserted into the SIM card slot of the user device 104, or an embedded SIM that is hardwired into the circuit board of the user device 104.

The one or more processors 208 and the memory 210 of the user device 104 may implement an operating system 218, device software 220, and/or one or more applications 222. The various software and applications may include routines, program instructions, objects, and/or data structures that perform particular tasks or implement particular abstract data types. The operating system 218 may include components that enable the user device 104 to receive and transmit data via various interfaces (e.g., user controls, communication interface 202, and/or memory input/output devices). The operating system 218 may also process data using the one or more processors 208 to generate outputs based on inputs that are received via the user interface 206. For example, the operating system 218 may provide an execution environment for the execution of the applications 222. The operating system 218 may include a presentation component that presents the output (e.g., display the data on an electronic display, store the data in memory, transmit the data to another electronic device, etc.).

The operating system 218 may include an interface layer that enables applications to interface with the wireless radio 212 and/or the communication interface 202. The interface layer may comprise public APIs, private APIs, or a combination of both public APIs and private APIs. Additionally, the operating system 218 may include other components that perform various other functions generally associated with an operating system. The device software 220 may include software components that enable the user device to perform functions. For example, the device software 220 may include a basic input/output system (BIOS), Boot ROM, or a bootloader that boots up the user device 104 and executes the operating system 218 following power up of the device.

The applications 222 may include applications that provide utility, entertainment, and/or productivity functionalities to a user of the user device 104. For example, the applications 222 may further include electronic mail applications, remote desktop applications, web browser applications, navigation applications, office productivity applications, streaming applications, and/or so forth.

Memory 210 includes a client buffer allocation manager 230. In the illustrated embodiment, the client buffer allocation manager 230 includes prior device location data 232, instant device location data 231, sector prediction engine 233, cell quality data 234, a QoS prediction engine 235, buffer cache adjustment engine 236, current QoS data 237, threshold data 238, key variables 239, and the buffer cache 245. In FIG. 2, the calculation of the buffer cache allocation is performed by the buffer cache adjustment engine 236.

The prior device location data 232 may include locations of the user device 104 and the times that the user device 104 was at the locations in the past. Some or all of the prior device location data 232 can be obtained from the wireless carrier network 102. For example, some of the prior device location data 232 can be obtained from one or more of the servers 114 prior to the current trip. Some or all of the prior device data also may be obtained by the mobile device and stored in the memory 210. For example, some or all of the prior device location data 232 may have been obtained via the wireless carrier network 102 prior to the current trip, with all subsequent prior device location data 232 until the current trip gathered by the mobile device from its sensors 204, etc. With prior location data 232 already present in the memory 210, the sector prediction engine 233 can provide predicted sector data to the QoS prediction engine 235 without obtaining additional device location data from another source.

In some embodiments, the client buffer allocation manager 230 may receive locations and/or corresponding time stamps of the user device 104 from sensors 204 via the location link 240. The locations may be derived from GPS sensors or compasses of the sensors 204. The client buffer allocation manager 230 may in addition, or alternatively, receive prior device location data 232 from the servers 114 of the wireless carrier network 102 via the wireless radio 212 and the data link 241 in some embodiments. Hence, the prior device location data 232 may include hundreds or thousands of prior device locations with corresponding times. In some embodiments, the prior device location data 232 are configured with at least a first pairing and a second pairing, where the first pairing includes a first location and a first time that the user device 104 was at the first location and the second pairing includes a second location and second time that the user device 104 was at the second location.

Instant device location data 231 may include the instant location (and time) of the user device. The instant location of the user device may be derived from a GPS sensor of the user device or a Wi-Fi signal that is received by the user device that can be mapped to a location, for example.

Sector prediction engine 233 is coupled to receive prior device location data 232 and instant device location data 231 and provide predicted sector data to the QoS prediction engine 235 based at least in part on the prior device location data 232 and the instant device location data 231.

In some embodiments, the client buffer allocation manager 230 signals to a process which will monitor the signal strength and other key variables 239 (Key Performance Indicators (KPIs)), such as, and without limitation, throughput (e.g., the sum of the upload and download speed), signal strength, resolution, bits per second (download speed), bits (out) per second (upload speed), and/or network latency. For example, in a video streaming context, download speed and/or latency may be the key variables or among the key variables. Latency and time-to-crossover, for example, are each inversely proportional to the amount of content to be cached to enhance the seamlessness at the crossover, given the same download speed (e.g., the greater the latency or the nearer (less time) to crossover, the more content should be cached). Similarly, the greater the download speed, the greater the content cached, given the same latency. These are but examples; the process that predicts QoS in the future sector may incorporate some or all key variables designated in the app, with corresponding adjustments in the cache allocation to optimize the user experience.

The QoS prediction engine 235 may receive the sector prediction data from the sector prediction engine 233. In some embodiments, and in accordance with the sector prediction data, the cell quality data 234 may be queried by the QoS prediction engine 235 to receive quality of service metric data for a sector that provides wireless coverage to the future sector predicted by the sector prediction engine 233. The cell quality data 234 may include data for the sector at some time in the past. Some or all of the cell quality data can be obtained from the wireless carrier network 102. For example, some of the cell quality data 234 can be obtained from one or more of the servers 114 prior to the current trip. Some or all of the cell quality data 234 also may be obtained by the mobile device and stored in the memory 210. For example, some or all of the cell quality data 234 may have been obtained via the wireless carrier network 102 prior to the current trip, with all subsequent cell quality data 234 until the current trip gathered by the mobile device from its sensors 204, etc. With the cell quality data 234 already present in the memory 210, the QoS prediction engine 235 may determine a predicted quality of service of wireless communications without obtaining additional cell quality data from another source.

The cell quality data 234 may include a table of cell identifiers with their corresponding key variables. These variables are monitored by the user device 104 over time and if loss is detected then the application will begin to cache the content ahead of total loss of network availability. At least some of these variables (e.g., bits per second (up or down), resolution, etc.) may be adjusted on the user device 104 alternatively or in combination with cache size. Based on the sector prediction data and the quality of service metric, QOS prediction engine 235 may determine a predicted quality of service of wireless communications from a wireless carrier network in the future sector and pass the predicted quality of service to buffer adjustment engine 236. A "sector" may be defined as a physical location such as a GPS coordinate. One or more "cells" of a wireless carrier network may provide coverage to a sector.

In FIG. 2, the buffer adjustment engine 236 receives the current QoS data 237, the threshold level of service quality 238, and the predicted quality of service from the sector prediction engine 235. The current QoS data 237 may be determined in accordance with data received from wireless radio 212 via data link 241, sensor(s) 204, and/or the like. The QoS data 237 may be a quantitative determination or a qualitative determination.

In one embodiment, the buffer adjustment engine 236 adjusts the allocation of the buffer cache 245 based at least in part on the predicted quality of service of the wireless communication from the wireless carrier network in the future sector. If the predicted quality of service in the future sector is significantly below average, increasing the allocation of the buffer cache 245 to buffer the content onto the user device 104 prior to experiencing the QoS may be useful to prevent disruption to the content. If the predicted quality of service in the future sector is excellent, increasing the buffer cache allocation may not be necessary since the excellent QoS in the future sector is unlikely to disrupt the user experience. If the predicted quality of service in the future sector is excellent, the allocation of the buffer cache 245 may be decreased for network efficiency purposes. When the buffer cache 245 is adjusted, the user device 104 may communicate the adjustment to the wireless carrier network 102.

In some embodiments, the allocation of the buffer cache 245 may be adjusted with reference to a high-water mark and/or a low-water mark in a read-ahead buffer of memory 210. The high-water mark and/or low-water mark in the read-ahead buffer may be set with regard to memory size or with regard to the seconds of media content that will be read ahead.

In some embodiments, the buffer adjustment engine 236 increases the allocation of the buffer cache 245 when the predicted quality of service of the wireless communication from the wireless carrier network in the future sector is below the threshold level of service quality 238 and the current QoS from the wireless carrier network is above the threshold level of service quality 238. In some embodiments, the threshold level of service quality 238 may be an average QoS measured over a relevant area and/or time period, such as the user's regular commute or customary drive. Therefore, the user can potentially take advantage of the current quality of service to stream media content to a user device prior to entering the predicted quality service that is significantly below the threshold so that the streaming experience is not interrupted. However, if a user device is simply moving from an excellent QoS to an above average QoS, increasing the allocation of the buffer cache 245 may not be necessary because no disruption in service would be expected/predicted. Therefore, in some embodiments, the buffer cache adjustment engine 236 may only increase the buffer cache allocation when the QoS of the predicted sector is below a threshold level of service 238 and the current QoS is at or above the threshold level.

Figure 3:
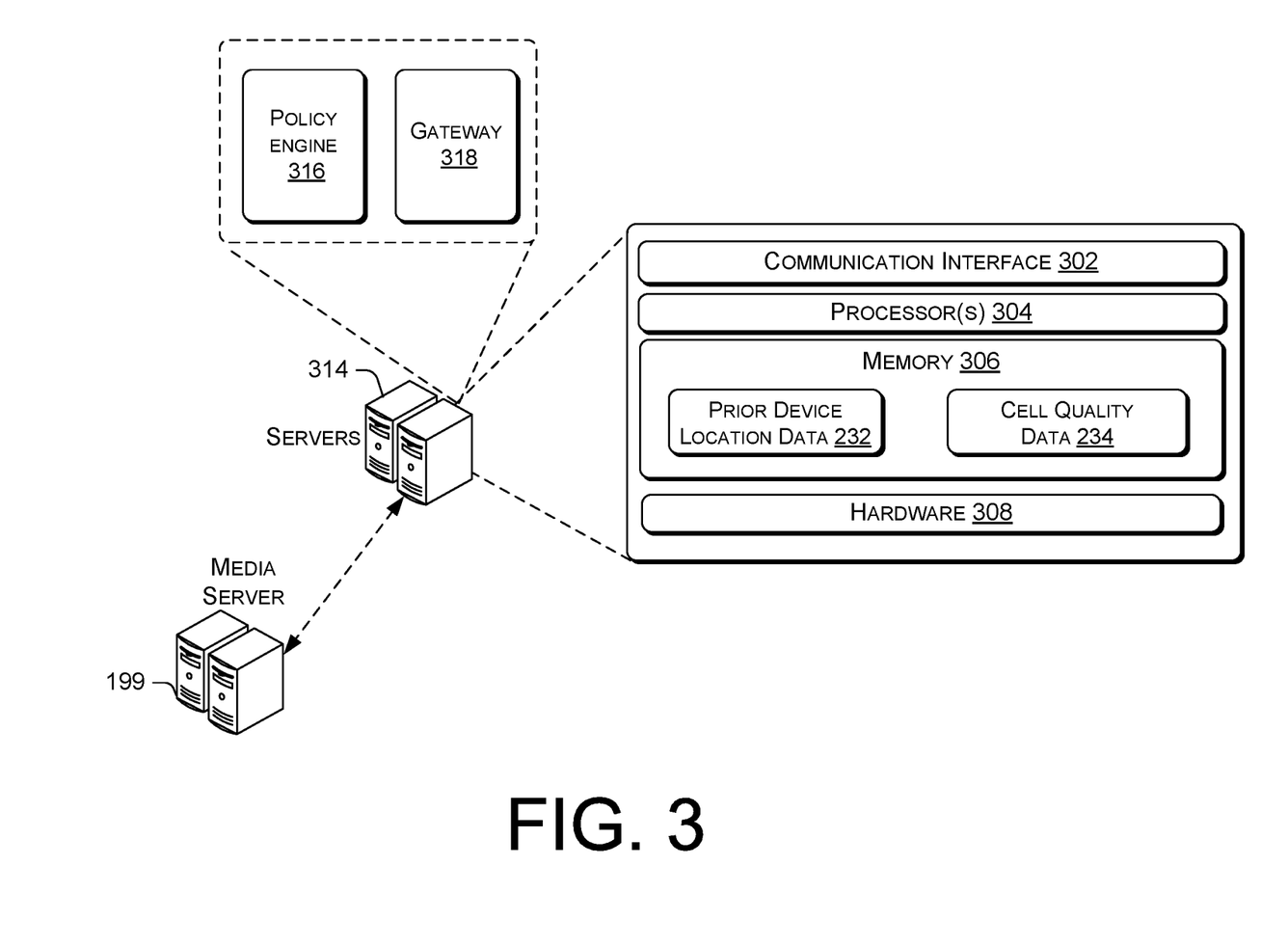
FIG. 3 is a block diagram showing various components of an example server(s) within a wireless carrier network that is configured to collect and store data for facilitating adjusting a buffer allocation of the buffer cache based at least in part on a predicted quality of service of a predicted future sector that the user device will encounter.

FIG. 3 is a block diagram showing various components of an example server(s) 314 within carrier network 102 that is configured to collect and store data for facilitating adjusting a buffer allocation of the buffer cache 245 based at least in part on a predicted quality of service of a predicted future sector that the user device will encounter.

In FIG. 3, server(s) 314 may include a communication interface 302, one or more processors 304, memory 306, and hardware 308. The communication interface 302 may include wireless and/or wired communication components that enable the server(s) 314 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism. In various embodiments, the processors 304 and the memory 306 of the server(s) 314 may execute a policy engine 316, a gateway 318, as well as other components of the core network 106. Server(s) 314 may have access to media servers 199 to provide streaming content to user devices 104/204.

In the illustrated embodiment, memory 306 includes prior device location data 232 and cell quality data 234. The prior device location data may be location data of the user device 104 and/or location data of other user devices. In some embodiments, key variables of performance and coverage of the wireless carrier network 102 are collected by the OSS of the wireless carrier network 102 and the key variables may be included in cell quality data 234. Each different user device on the wireless carrier network 102 may contribute to reporting the key variables to the wireless carrier network 102. Thus, the wireless carrier network 102 may maintain cell quality data 234 for each cell in the wireless carrier network 102 and the cell quality data 234 may be accessed by user device 104 for purposes of determining a predicted QoS in a future sector that is provided coverage by a given cell in the wireless carrier network 102. Prior device location data 232 may also be stored in the memory 306 and all or a portion of the prior device location data 232 may be provided to the user device 104 for purposes of determining a predicted QOS in a future sector that is provided coverage by a given cell in the wireless carrier network 102. In one embodiment, the prior device location data 232 and the cell quality data 234 are made available through an Application Programming Interface (API) to the user device 104. However, in some embodiments described herein, the user device 104 collects its prior location data 232 and instant location data 231, as well as relevant key variables 239, and need not rely on the server(s) 314 for this information or to process the same.

Figure 4:
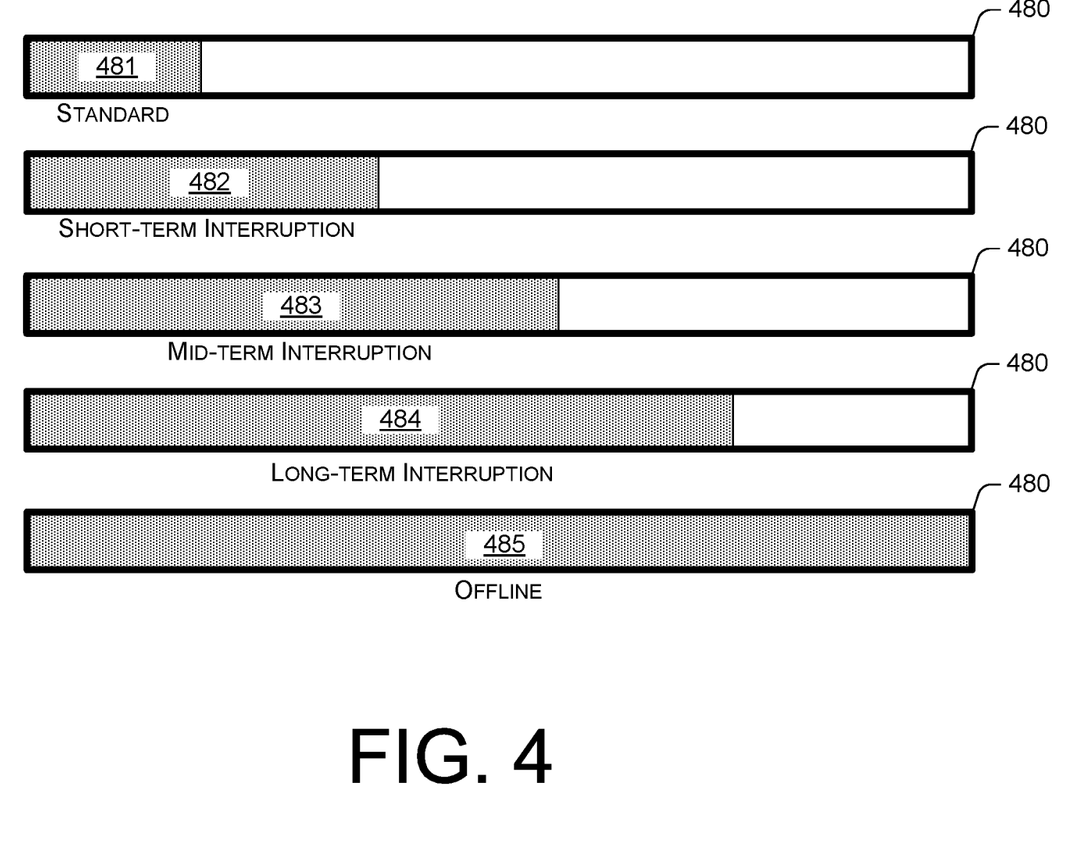
FIG. 4 illustrates example buffer allocations as they relate to predicted data interruptions from a wireless carrier network.

FIG. 4 illustrates example buffer allocations as they relate to predicted data interruptions from a carrier network. A standard buffer allocation 481 of buffer cache 480 may be 40 megabytes in a streaming video context, for example. The illustrated buffer allocations and buffer cache 480 of FIG. 4 may be applicable to buffer allocations 175, 177, 179 and buffer cache 245. While a predicted quality of service in a predicted future sector is satisfactory (e.g., above a given threshold), the standard buffer allocation 481 may be assigned to buffer cache 480 in FIG. 4. It is understood by those skilled in the art that the "standard" buffer allocations may differ depending on the category of media being delivered. For example, the standard buffer allocation may be larger for video streaming than it would be for audio streaming.

If a short-term interruption is predicted (based on QoS service of predicted future sector or predicted future sectors), the buffer allocation of buffer cache 480 may be increased to a short-term interruption allocation size 482. If a mid-term interruption is predicted (based on QoS service of predicted future sector or predicted future sectors), the buffer allocation of buffer cache 480 may be increased to a mid-term interruption allocation size 483. Similarly, if a long-term interruption is predicted (based on QoS service of predicted future sector or predicted future sectors), the buffer allocation of buffer cache 480 may be increased to a long-term interruption allocation size 484. Finally, if a total absence of coverage is predicted, (based on QoS service of predicted future sector or predicted future sectors), the buffer allocation of buffer cache 480 may be increased to an offline allocation size 485.

Figure 5:
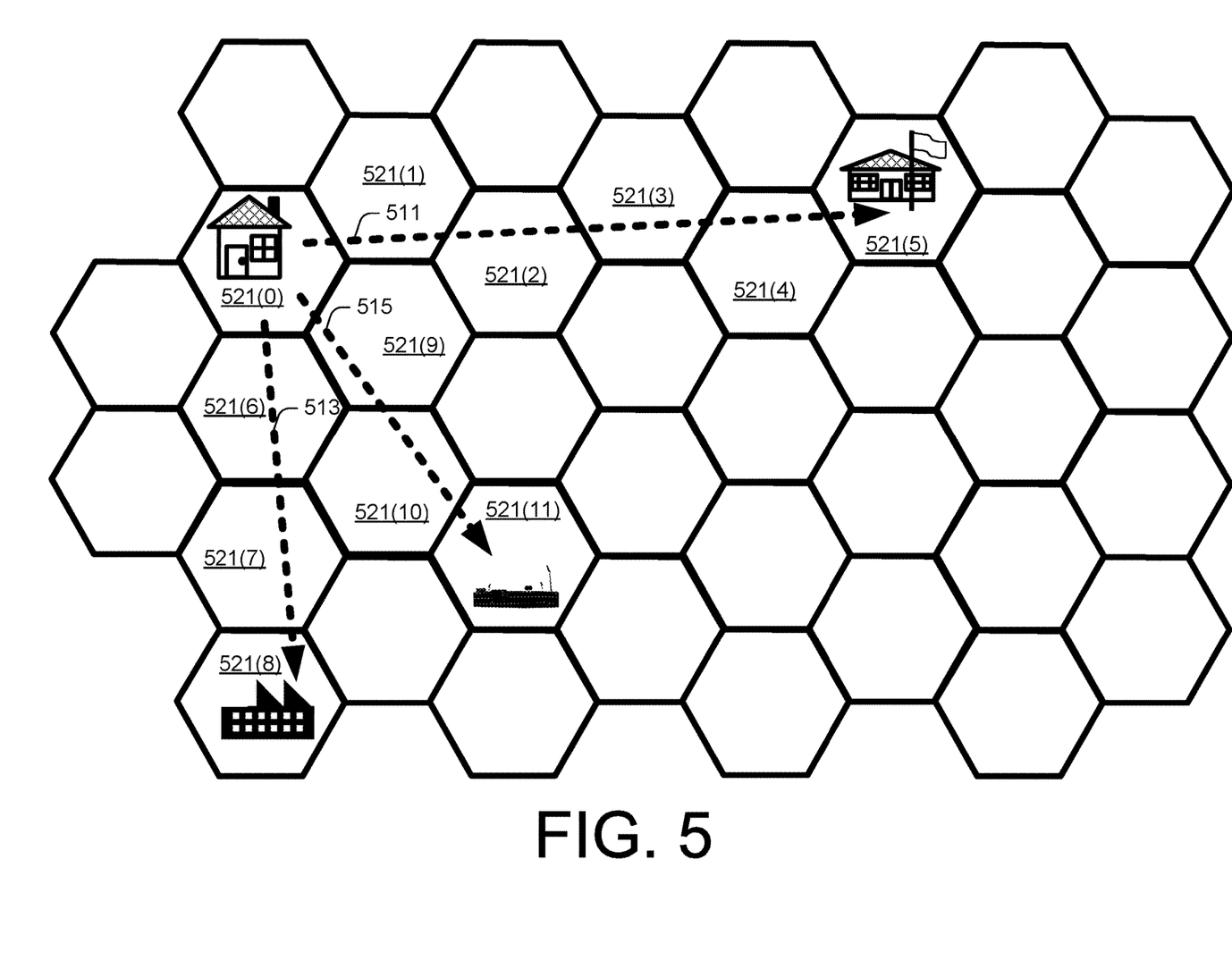
FIG. 5 illustrates an example of travel by a user device.

FIG. 5 illustrates an example of travel by a user device. In FIG. 5, a user device may generally travel from a home of a user in sector 521(0) to work in sector 521(8) on Monday, Wednesday, and Friday mornings taking path 513. On Tuesdays and Thursdays afternoons, a user device may generally travel from a home of a user in sector 521(0) to school in sector 521(5) taking path 511. Prior device location data 232 may include a data log that reflects the user's habit to travel with a user device (e.g., 104/204) along path 513 on Monday, Wednesday, and Friday mornings and to travel path 511 on Tuesday and Thursday afternoons. Path 511 travels through sectors 521(0), 521(1), 521(2), 521(3), 521(4), and 521(5) and path 513 travels through sectors 521(0), 521(6), 521(7), and 521(8).

Having access to both prior device location data 232 and instant device location data 231, sector prediction engine 233 may predict that a user device will travel through sector 521(7) when the user device has already travelled through sector 521(0) and 521(6) on a Monday morning. Hence, sector prediction engine 233 may pass sector 521(7) to QoS prediction engine 235 as sector prediction data, in that example. Similarly, sector prediction engine 233 may predict that a user device will travel through sector 521(2) when the user device has already travelled through sector 521(0) and 521(1) on a Tuesday afternoon. Hence, sector prediction engine 233 may pass sector 521(2) to QoS prediction engine 235 as sector prediction data, in that example.

FIG. 5 also illustrates a user device traveling along path 515 through sectors 521(0), 521(9), 521(10), and 521(11) from the user's home to a sporting event at a stadium. Even if the user device rarely, or has never travelled along path 515, sector prediction engine 233 may still predict that the user device will encounter sector 521(10) based on the direction of travel established by the vector formed by travelling from sector 521(0) to 521(9). Hence, even a limited amount of prior device location data 232 may be useful to predict a sector that will be encountered by a user device.

Figure 6:
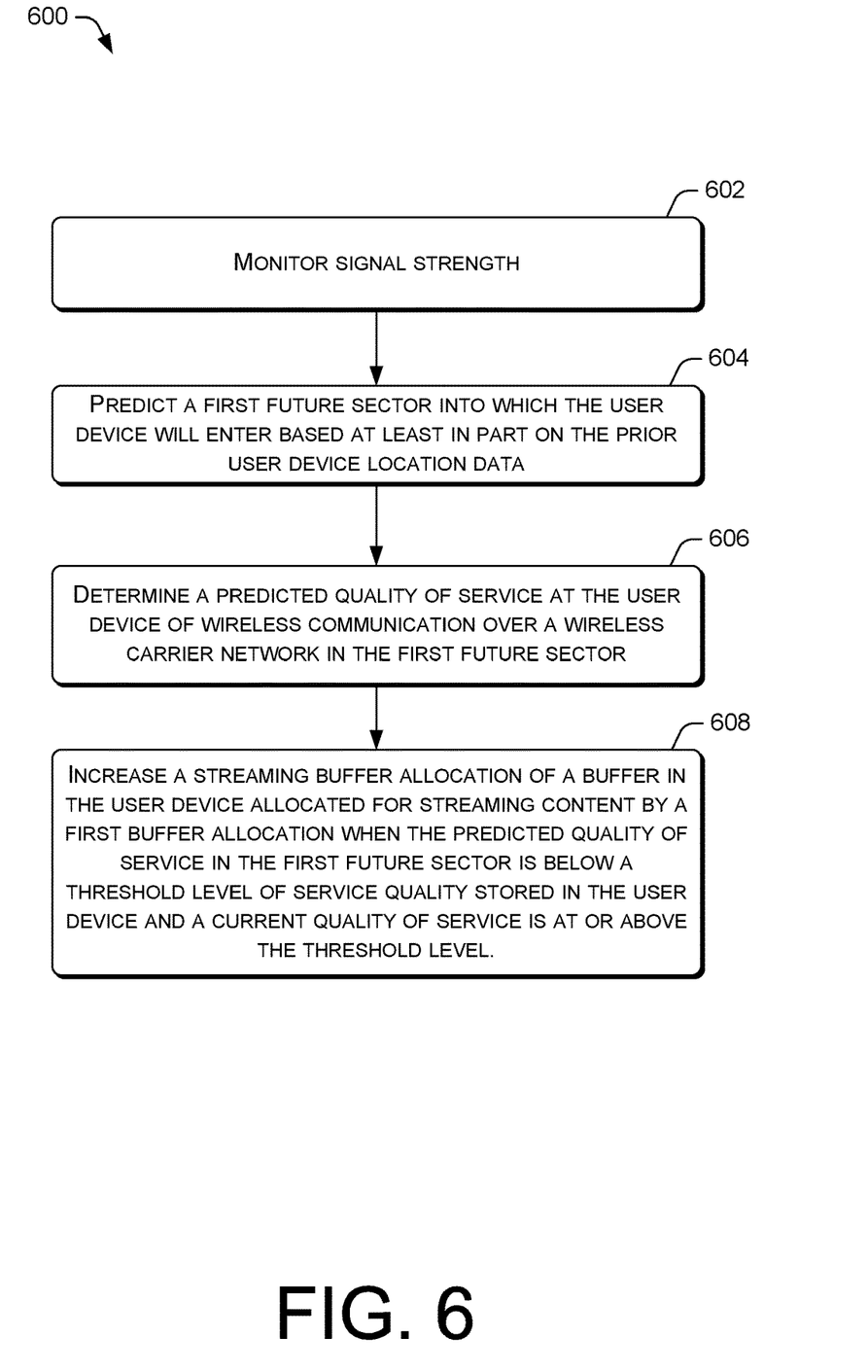
FIG. 6 is a flow diagrams of example process for adjusting a buffer cache allocation based at least in part on a predicted quality of service of a predicted future sector that the user device will encounter being lesser than the quality of service in the its current sector.
Figure 7:
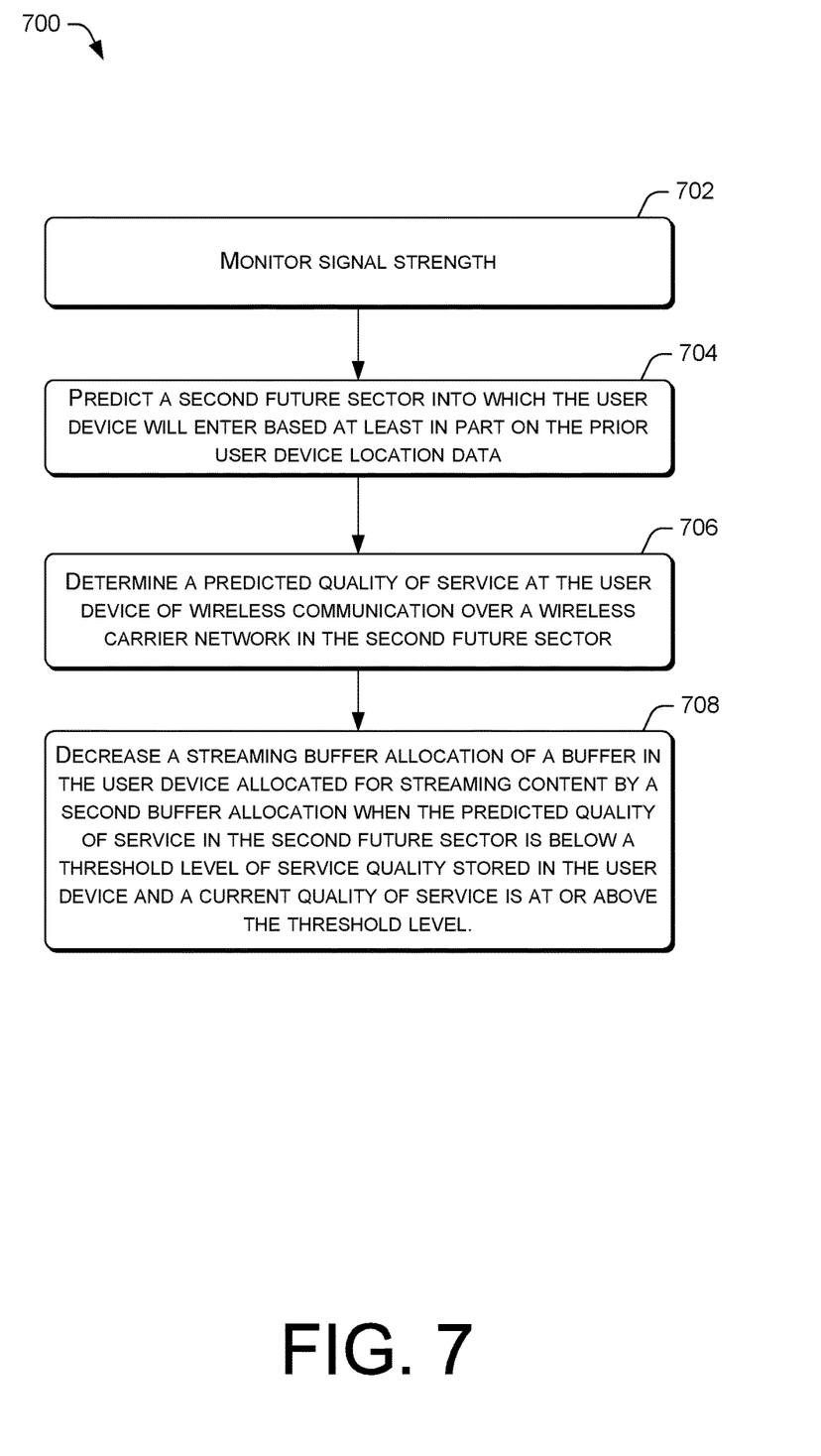
FIG. 7 is a flow diagram of an example process for adjusting a buffer cache allocation based at least in part on a predicted quality of service of a predicted future sector that the user device will encounter being greater than the quality of service in its current sector.

FIGS. 6 and 7 are flow diagrams of example processes 600 and 700 for adjusting a buffer cache allocation based at least in part on a predicted quality of service of a predicted future sector that the user device will encounter. Processes 600 and 700 are each illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process.

FIG. 6 is a flow diagrams of example process 600 for adjusting a buffer cache allocation based at least in part on a predicted quality of service of a predicted future sector that the user device will encounter being lesser than the quality of service in the its current sector. In block 602, the client buffer allocation manager 230 signals to a process to monitor signal strength of input content in various circumstances. In the context of a cellular environment, the signal strength may be measured for each sector or for particular locations within the network (within a sector). The data gathered is added to the cell quality data 234 for access by the QoS prediction engine 235.

In block 604, the sector prediction engine 233 predicts a first future sector into which the user device 104 will enter based at least in part on prior location data 232 for the user device 104. The prior location data 232 is gathered from previous travel over the same area as determined by the one or more sensors 204, with associated time stamps as described herein.

In block 606, the QoS prediction engine 233 determines a predicted quality of service at the user device 104 of wireless communication over the wireless carrier network 102 in the first future sector. The predicted quality of service in the first future sector may correspond to the QoS 165 described with respect to FIG. 1.

In block 608, the buffer cache adjustment engine 236 increases a streaming buffer cache allocation of a buffer cache in the user device 104 allocated for streaming content by a first buffer allocation when the predicted QoS in the first future sector is below a threshold level of service quality stored in the user device 104, and a current QoS is at or above the threshold level. The buffer cache allocation may correspond to the buffer cache allocation 175 (increased to the buffer cache allocation 177 as described herein) to enter the sector having the QoS 165. The threshold level of service quality may correspond to the threshold level 238 and the current QoS may correspond to the QoS 163.

FIG. 7 is a flow diagram of an example process 700 for adjusting a buffer cache allocation based at least in part on a predicted quality of service of a predicted future sector that the user device will encounter being greater than the quality of service in its current sector. In block 702, the client buffer allocation manager 230 signals to a process to monitor signal strength of input content in various circumstances. In the context of a cellular environment, the signal strength may be measured for each sector or for particular locations within the network (within a sector). The data gathered is added to the cell quality data 234 for access by the QoS prediction engine 235.

In block 704, the sector prediction engine 233 predicts a second future sector into which the user device 104 will enter based at least in part on prior location data 232 for the user device 104. The prior location data 232 is gathered from previous travel over the same area, subsequent to the first future sector, as determined by the one or more sensors 204, with associated time stamps as described herein.

In block 706, the QoS prediction engine 233 determines a predicted quality of service at the user device 104 of wireless communication over the wireless carrier network 102 in the second future sector. The predicted quality of service in the second future sector may correspond to the QoS 167 described with respect to FIG. 1.

In block 708, the buffer cache adjustment engine 236 decreases a streaming buffer cache allocation of a buffer cache in the user device 104 allocated for streaming content by a second buffer allocation when the predicted QoS in the second future sector is below a threshold level of service quality stored in the user device 104, and a current QoS is at or above the threshold level. The buffer cache allocation may correspond to the buffer cache allocation 177 (decreased to the buffer cache allocation 179 as described herein) to enter the sector having the QoS 167. The threshold level of service quality may correspond to the threshold level 238 and the current QoS may correspond to the QoS 165.

In one embodiment, the prior device location data includes at least a first pairing and a second pairing where the first pairing includes a first location and a first time that the device was at the first location and the second pairing includes a second location and a second time that the device was at the second location. In one embodiment, the streaming content includes at least one of video content or audio content.

The memory of the user device may include instructions that, when executed, cause the user device to perform operations corresponding to those described herein, including but not limited to the processes 600 and 700.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
monitoring, by a user device, one or more key variables of an incoming wireless signal;
predicting, at the user device, a first future sector and a second future sector into which the user device will enter at a first time and a second time, respectively, and based at least in part on prior device location data;
determining, at the user device, a predicted quality of service of wireless communication over a wireless carrier network in each of predicted first future sector and the second future sector;
increasing, by the user device, a buffer cache allocation of a buffer cache in the user device allocated for caching content by a first buffer cache allocation when the predicted quality of service in the first future sector is below a first threshold level of service quality stored in the user device and a current quality of service of wireless communications over the wireless carrier network is above a current threshold level;
determining the predicted quality of service in the second future sector; and
decreasing a streaming buffer allocation by a second buffer allocation when the predicted quality of service in the second future sector is below a second threshold level of service quality and a current quality of service of wireless communications over the wireless carrier network at the first time is above the first threshold level,
wherein the first threshold level is above the current threshold level and the second threshold level is below the first threshold level.

2. The computer-implemented method of claim 1, wherein the computer-implemented method further comprises:
when the predicted quality of service in the first future sector is below the first threshold level of service quality and the current quality of service is above the current threshold level:
storing additional content in the buffer cache corresponding to the first buffer cache allocation before the user device enters the first future sector.

3. The computer-implemented method of claim 1, further comprising:
accessing the prior device location data stored in the user device that includes at least a subsequent location at the second time, wherein the second time is subsequent to the times of the locations in the prior device location data.

4. The computer-implemented method of claim 1, wherein the key variables include download speed of the content to the user device and network latency of the wireless carrier network.

5. The computer-implemented method of claim 4, wherein the key variables are monitored over time on the user device.

6. The computer-implemented method of claim 1, further comprising:
storing the content in the buffer cache;
running an algorithm that inputs the key variables, data of the current quality of service, and the first threshold level; and outputting a signal for the increasing of the buffer cache allocation of the buffer cache in accordance with the results of running the algorithm.

7. The computer-implemented method of claim 1, further comprising:
accessing, from memory in the user device, the prior device location data that includes prior locations of the user device and times that the user device was present at the locations.

8. A mobile device including:
a cellular data communication interface including an antenna to facilitate cellular communication with a wireless carrier network;
processing logic coupled to the cellular data communication interface; and
memory coupled to the processing logic, wherein the memory includes instructions that, if executed, cause the mobile device to perform operations comprising:
accessing, from storage in the mobile device, prior device location data that includes locations of the mobile device and times that the mobile device was present at the locations;
predicting a first future sector and a second future sector into which the mobile device will enter at a first time and a second time, respectively, and based at least in part on the prior device location data;
determining a predicted quality of service of wireless communications using the mobile device over the wireless carrier network in each of the first future sector and the second sector;
measuring a current quality of service over the wireless carrier network in a current sector in which the mobile device is present;
increasing a streaming buffer cache allocation of a streaming buffer cache in the mobile device by a first buffer allocation when the predicted quality of service in the first future sector is below a first threshold level of service quality stored in the mobile device and the current quality of service is above a current threshold level; and
decreasing a streaming buffer cache allocation by a second streaming buffer cache allocation when the predicted quality of service is below a second threshold level of service quality and a current quality of service at the first time is above the first threshold level,
wherein the first threshold level is above the current threshold level and the second threshold level is below the first threshold level.

9. The mobile device of claim 8, wherein the instructions, if executed, cause the mobile device to perform at least one further operation comprising:
when the predicted quality of service in the first future sector is below the first threshold level of service quality and the current quality of service is above the current threshold level:
buffering additional streaming data in the streaming buffer cache corresponding to the first buffer allocation before the mobile device enters the first future sector.

10. The mobile device of claim 8, wherein the instructions, if executed, cause the mobile device to perform further operations comprising:
accessing additional device location data stored in the mobile device that includes at least a subsequent location at the second time, wherein the second time is subsequent to the times of the locations in the prior device location data.

11. The mobile device of claim 8, wherein the instructions, if executed, cause the mobile device to perform further operations comprising:
monitoring key variables of an incoming wireless signal of streaming content;
storing the streaming content in the streaming buffer cache;
running an algorithm that inputs the key variables, data of the current quality of service, and the first threshold level; and
outputting a signal for the increasing of the streaming buffer cache in accordance with the results of running the algorithm.

12. The mobile device of claim 11, wherein the key variables include download speed of the streaming content to the mobile device and network latency of the wireless carrier network.

13. The mobile device of claim 12, wherein the key variables are monitored over time on the mobile device.

14. A non-transitory computer-readable medium storing executable instructions that, if executed by one or more computing devices, cause the one or more computing devices to perform operations comprising:
monitoring, by a user device, one or more key variables of an incoming wireless signal;
predicting, at the user device, a first future sector and a second future sector into which the user device will enter at a first time and a second time, respectively, and based at least in part on prior device location data;
determining, at the user device, a predicted quality of service of wireless communication using the user device over a wireless carrier network in the first future sector and the second future sector;
increasing, by the user device, a buffer cache allocation of a buffer cache in the user device allocated for caching content by a first buffer cache allocation when the predicted quality of service in the first future sector is below a first threshold level of service quality stored in the user device and a current quality of service of wireless communications over the wireless carrier network is above a current threshold level;
determining the predicted quality of service in the second future sector; and
decreasing a streaming buffer allocation by a second buffer allocation when the second predicted quality of service in the second future sector is below a second threshold level of service quality and a current quality of service of the wireless communications over the wireless carrier network at the first time is above the first threshold level,
wherein the first threshold level is above the current threshold level and the second threshold level is below the first threshold level.

15. The non-transitory computer-readable medium of claim 14, storing further executable instructions that, if executed by the one or more computing devices, cause the one or more computing devices to perform at least one further operation comprising:
when the predicted quality of service in the first future sector is below the first threshold level of service quality and the current quality of service is above the current threshold level:

storing additional content in the buffer cache corresponding to the first buffer cache allocation before the user device enters the first future sector.

16. The non-transitory computer-readable medium of claim 14, storing further executable instructions that, if executed by the one or more computing devices, cause the one or more computing devices to perform further operations comprising:

accessing additional device location data stored in the user device that includes at least a subsequent location and a subsequent time that the user device was at the subsequent location at the second time, wherein the second time is subsequent to the times of the locations in the prior device location data.

17. The non-transitory computer-readable medium of claim 14, wherein the key variables include download speed of the content to the user device and network latency of the wireless carrier network.

18. The non-transitory computer-readable medium of claim 17, wherein the key variables are monitored over time on the user device.

19. The non-transitory computer-readable medium of claim 14, storing further executable instructions that, if executed by the one or more computing devices, cause the one or more computing devices to perform further operations comprising:

storing the content in the buffer cache;

running an algorithm that inputs the key variables, data of the current quality of service, and the first threshold level; and outputting a signal for the increasing of the buffer cache allocation of the buffer cache in accordance with the results of running the algorithm.

20. The non-transitory computer-readable medium of claim 14, storing further executable instructions that, if executed by the one or more computing devices, cause the one or more computing devices further to perform at least one further operation comprising:

accessing, from memory in the user device, the prior device location data that includes prior locations of the user device and times that the user device was present at the locations.

* * * * *